Oct. 11, 1938.  A. CALLENDER  2,133,246
AUTOMATIC CONTROL OF VARIABLE PHYSICAL CHARACTERISTICS
Filed June 14, 1935  2 Sheets-Sheet 1

Inventor:
ALBERT CALLENDER
By
Roy F. Steward
Attorney

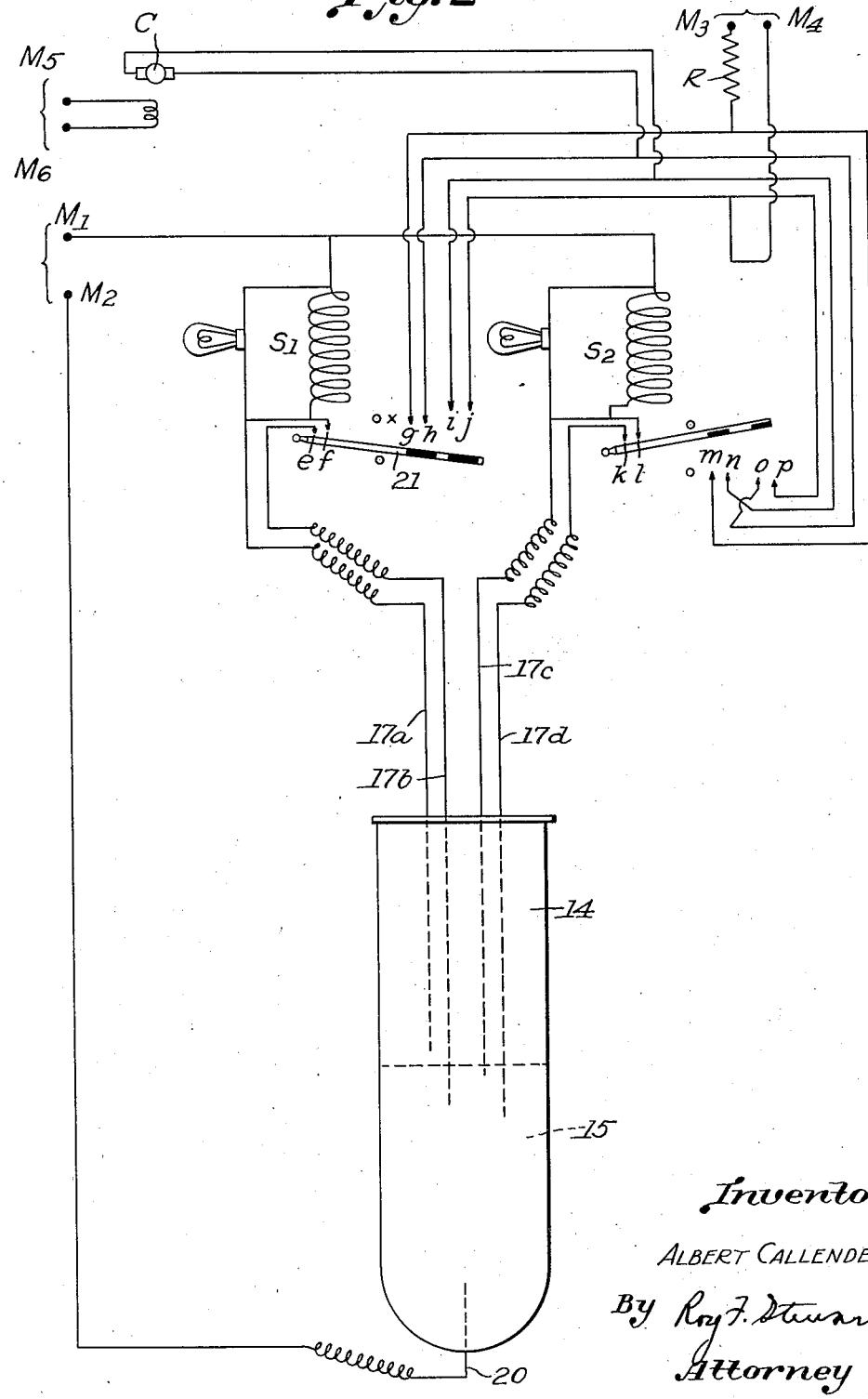

Patented Oct. 11, 1938

2,133,246

UNITED STATES PATENT OFFICE 2,133,246

AUTOMATIC CONTROL OF VARIABLE PHYSICAL CHARACTERISTICS

Albert Callender, Winnington, Northwich, England, assignor to Imperial Chemical Industries Limited, a corporation of Great Britain Application June 14, 1935, Serial No. 26,696
In Great Britain June 20, 1934

10 Claims. (Cl. 236—74)

This invention relates to the automatic control of variable physical characteristics, for example temperature or pressure, and in general of any physical characteristic a change in which can be translated into a displacement of matter by means of a suitable indicating or recording instrument.

Various systems of automatic control of variable physical characteristics are known at the present time, some of which aim at a system in which any change of the characteristic is followed by a compensating action the rate of which is a function of the rate of change of the characteristic and also of the absolute magnitude of the deviation of the same from the desired value, and in which the characteristic will arrive at the desired value without "hunting". These known systems are complicated in construction and therefore costly and not easily repaired in the event of their failing in service. Those systems which depend for their compensating action upon a series of impulses at uniform short time intervals have the disadvantage that considerable wear and tear of the operating parts takes place.

The principal object of the present invention is to provide a system for the automatic control of a variable physical characteristic which satisfies all practical requirements as to efficiency, even should there be an interval of time between the occurrence of any compensating action and the effect of such action upon the characteristic being controlled, and which is nevertheless simple in construction and economical in operation.

A further object of the invention is to provide an automatic control system which is self-adjusting in the sense that no external adjustment is required to enable it to maintain the desired value of the characteristic in spite of permanent or prolonged changes in any conditions liable to affect the same.

The essential feature of the improved system is that the relative movements of (1) an indicating member tracing the variations of the characteristic to be controlled and of (2) the level of a liquid surface are utilized, through a relay system, to operate compensating means tending to restore the desired value of the characteristic, the resulting action of the compensating means being such that, (through a coupling means by which any change in the position or setting of the compensating means is caused to influence the level of the liquid surface by changing, by an amount dependent upon and preferably sensibly proportional to the corresponding change in the compensating effect, the volume, as measured up to a predetermined level, that is immediately available for a body of the same liquid in communication with the liquid constituting the aforesaid surface), it causes this level to follow closely in stepwise manner, within predetermined limits, the movements of the indicating member, and further, the arrangement being such that the aforesaid liquid level tends to return to a predetermined level corresponding to the desired value of the characteristic to be controlled, by means of liquid flow through a resistant path preferably between the body of liquid the surface of which follows the movements of the indicating member and an external body of liquid of such a magnitude that the level of the same will be substantially unaffected by said flow and the level of which is set to the desired value of the characteristic.

By the term "coupling means" is to be understood any form of connection between the compensating means and the level of the liquid surface, such that any change in the position or setting of the compensating means is caused to influence the level of the liquid surface by changing, by an amount dependent upon and preferably sensibly proportional to the corresponding change in the compensating effect, the capacity of the liquid container as measured up to a fixed arbitrary datum level. The capacity of the liquid container is the space therein bounded by solid walls, by the said datum level and by the outlet to the resistant path.

It is possible to arrange for the predetermined liquid level to be displaced in accordance with any desired behaviour of the characteristic. For example, the system may be applied to the automatic control of a temperature which is required to change with time.

In a modification of the system the aforesaid volume, as measured up to the predetermined level, is further changed by an amount dependent upon the magnitude of a further characteristic, hereinafter referred to as a causal characteristic, the variations of which may be expected to lead to variations of the characteristic to be controlled.

Further features of the invention relate to means for compensating for backlash or lost motion which may exist between the position or setting of the compensating means itself and whatever external part of, or drive to, the compensating means is utilized for coupling to the automatic control system, and to means for obtaining a suitable compensating effect in cases where the compensating effect due to a given displacement of the compensating means is not proportional to that displacement.

In a preferred form of the invention the indicating member carries two pairs of vertical wires, the lower ends of which terminate in points at slightly different heights and are adapted to make electrical contact with a mercury surface. Each pair of points is wired to a system of relays in such a way that when the upper point touches the mercury surface a circuit is closed and remains so until the lower point leaves the mercury surface, and when the lower point leaves the mercury surface the circuit is broken and remains so until the upper point touches the mercury surface. The two pairs of points are arranged at slightly different heights; when the circuit controlled by the upper pair is in the closed condition, the compensating means—due to electrical or other actuating mechanism, for example, oil pressure—is operating in that direction which ultimately tends to raise the points, and when the circuit controlled by the lower pair is in the open condition the compensating means is operating in that direction which ultimately tends to lower the points; when the circuit controlled by the upper pair is in the open condition and when simultaneously the circuit controlled by the lower pair is in the closed condition, the compensating means is stationary.

An advantage of this system is that chattering of the relays due to incidental makes and breaks of contact at the mercury surface because of vibration or other causes, is eliminated.

The invention will be better understood by reference to the accompanying drawings, in which:—

Figure 2 is a diagrammatic arrangement showing in principle an electrical relay circuit suitable for use in connection with the arrangement of either Figure 1 or Figure 3.

Figure 1:
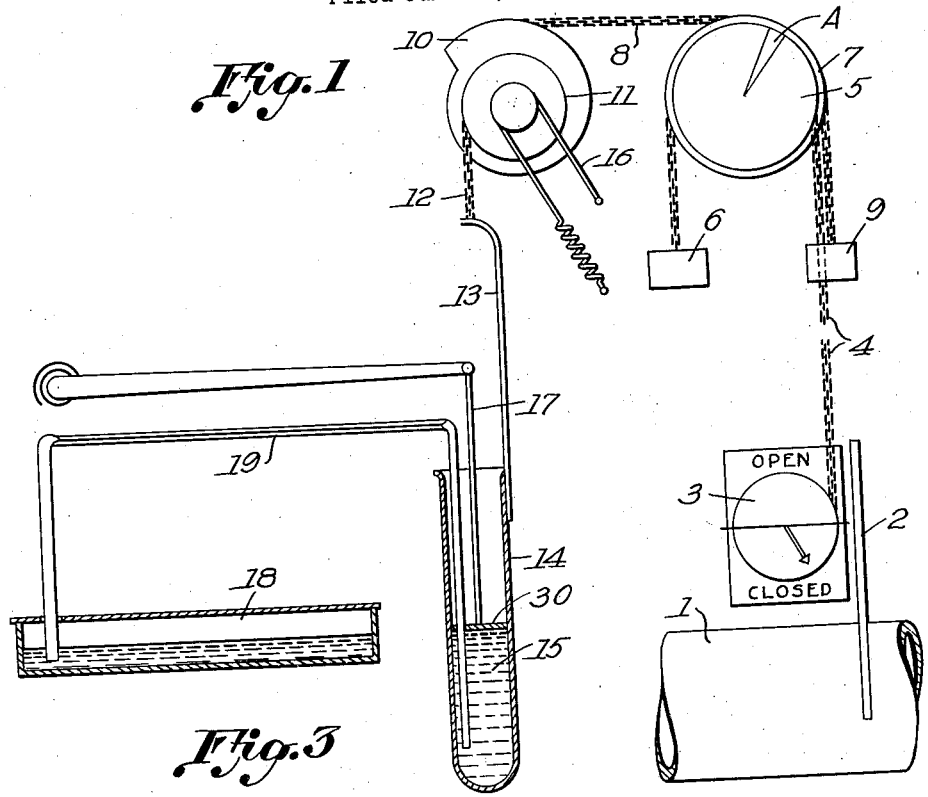
Figure 1 is a diagrammatic arrangement of an automatic control for the temperature of a system to which heat is supplied by means of a heating medium, e. g. steam, the flow of which can be controlled by a valve.

It will be understood that the systems shown in the drawings may be applied to the control of any variable physical characteristic, although for the sake of simplicity reference is made to temperature. The systems shown in the drawings are intended to be examples illustrative of the principles of the invention, and the invention is not limited to these examples.

Referring to Figure 1, the supply of heating medium, e. g. steam, to the system the temperature of which is to be controlled, is via a pipe 1 having a regulating valve 2, this valve being operated by a motor and reduction gearing which are not shown in the drawings. The indicator of the valve carries a pulley 3 to which is attached a chain 4 passing over a pulley 5 and having a counterweight 6 at its free extremity.

A second pulley 7, which is co-axial with the pulley 5, is connected to the latter by means of an adjustable pin and slot device so as to permit of a small predetermined amount of free relative movement of the two pulleys, indicated by the angle A. This free movement corresponds to the backlash (if any) between the point of attachment of the valve indicator and the valve itself. The second pulley 7 carries a chain 8, one end of which is free and carries a counter-weight 9 while the other end is attached to a cam wheel 10, to which is fixed a drum 11 carrying a chain 12. The free extremity of the latter is connected to an extension 13 fitted to a tubular vessel 14 containing a body of mercury 15. The cam wheel 10 is so shaped that the movement of the vessel 14 is substantially proportional to the change in the rate of flow (quantity per unit time) of the heating medium past the valve 2, which results from alteration of the valve setting.

The arrangement is such that when the pulley 3 moves as the valve is opened, the vessel 14 is lowered, and when it moves as the valve closes the vessel 14 is raised. The power operating the valve is controlled by relays operated in accordance with the relative positions of the indicating member 17 and the surface 30 of the mercury in the vessel 14, the arrangement of the relays being explained below with reference to Figure 2. A light brake 16 acting on the spindle of the drum 11 ensures that the backlash between the pulleys 5 and 7 is normally fully taken up one way or the other.

As will be seen later, the relay system causes valve 2 to move in such a way that the mercury surface 30 in vessel 14 follows closely in stepwise manner the movements of the indicating member 17. Mercury in a reservoir 18 is connected via capillary tube 19 to the mercury in vessel 14. Mercury flows through the capillary tube 19 whenever the surface level of the mercury in 14 is different from that in the reservoir 18, at a rate proportional to the existing difference in level at any moment. The reservoir 18 has such an area that the mercury level within it remains sensibly constant, and therefore the surface 30 will always tend to the same level, notwithstanding permanent or prolonged changes in the position of the vessel 14 as a result of permanent or prolonged changes in some condition or conditions tending to affect the value of the characteristic to be controlled. Thus the valve is free to settle anywhere within its working range and no external adjustment of the system is required to enable it to maintain the desired value of the characteristic in spite of permanent or prolonged changes in any condition liable to affect the same.

If desired, the reservoir 18 may be moved so as to displace the standard mercury level in accordance with any desired behaviour of the characteristic. Thus if the temperature is required to increase progressively with time, the reservoir 18 will be raised in the appropriate manner.

Referring now to Figure 2, the indicating member (17 in Figure 1), which rises as the temperature rises, carries four wires the lower ends of which terminate in points 17a, 17b, 17c and 17d at slightly different heights. The points 17a and 17b are wired to a relay system comprising a solenoid $S_1$ and a switch 21 operated thereby, the points 17c and 17d are wired to a similar relay system comprising a solenoid $S_2$ and a switch 22 operated thereby. The solenoids $S_1$ and $S_2$ are connected to the main terminal $M_1$ and the other main terminal $M_2$ is connected to the mercury 15 via contact 20. It will be understood that where necessary, e. g. to limit sparking at the contacts, amplification of the current flowing as a result of contact between points carried by the indicating member and the mercury, may be employed, although for the sake of simplicity details of amplification devices have not been included in Figure 2.

When the point 17a touches the mercury surface the circuit through the solenoid S₁ is completed and the switch 21 is lifted to close the three pairs of contacts e, f; g, h; and i, j. Current then flows through the armature C of the motor operating the valve 2 of Figure 1, via main terminal M₃, resistance R, contacts g, h, motor armature and back via contacts i, j to main terminal M₄. This causes the valve to open and the vessel 14 to descend by a corresponding amount. The resistance R may be regarded as a permanently inserted starting resistance for the motor and is conveniently inserted in this position to prevent short-circuiting across the mains M₃, M₄ due to possible accidental movements of the switches 21 and 22.

Solenoid S₁ remains energized as long as the point 17b is submerged, notwithstanding any breaking of contact between 17a and the mercury surface, but as soon as point 17b leaves the mercury surface the solenoid S₁ is de-energized and the switch 21 falls, breaking the circuit to the motor.

If the point 17d, which is slightly lower than 17b, leaves the mercury surface, solenoid S₂ is de-energized and switch 22 drops to open contacts k, l; and close contacts m, n; and o, p. The switch 22 remains in this position until the point 17c meets the mercury surface, when the solenoid S₂ is again energized. It will be seen that when the switch 22 closes the contacts m, n; o, p, current can flow to the armature C via contacts m, n and back via contacts o, p, and that the circuit is such that the current is supplied to the motor in the direction opposite to that following the closing of switch 21. Thus the valve is caused to close and the vessel 14 ascends by a corresponding amount. The stepwise movement of the mercury surface 30 takes place downwards between the points 17a and 17b, or upwards between the points 17c and 17d respectively according as the group of points as a whole is tending to enter or leave the mercury.

Main terminals M₅ and M₆ denote the terminals of the field winding of the motor. It is not necessary that the voltage across terminals M₁, M₂ should be the same as that across M₃, M₄ or M₅, M₆.

Figure 3:
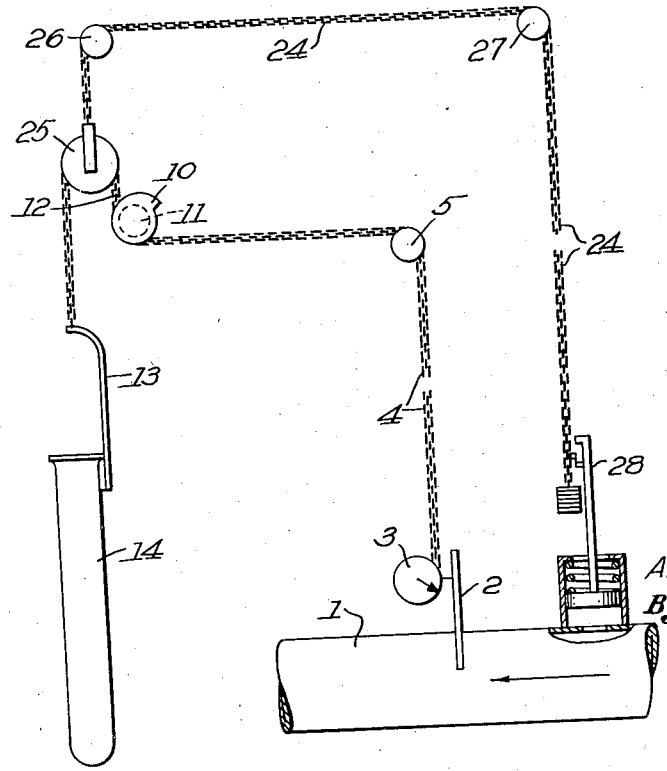
Figure 3 is a diagrammatic arrangement of the system of Figure 1 modified by an additional change of the aforesaid available volume dependent upon fluctuation of the pressure of the heating medium.

Figure 3 shows how the effect of variations in a causal characteristic may be taken into account without waiting for the system to reflect such variations through variations of the characteristic to be controlled. The pulley 3 carried by the valve indicator has attached to it a chain 4, passing over a pulley 5 and connected to a cam wheel 10 as in Figure 1. (For the sake of simplicity the backlash compensating arrangement of Figure 1 has been omitted in Figure 3.) A chain 12 attached to the drum 11 of the cam wheel passes over a pulley 25 and is attached to the extension 13 fitted to the mercury vessel 14.

The pulley 25 is supported by a chain 24 passing over pulleys 26 and 27 and attached to a piston 28 which moves in accordance with the pressure of the heating medium in the pipe 1. If the pressure rises, which would lead eventually, i. e. after an interval of time peculiar to the system under control, to an increase of temperature, the vessel 14 tends to fall by a corresponding amount, causing the control system to operate as though the temperature had already risen, although it has not yet been affected by the increase in pressure of the heating medium. Thus the control system anticipates the effect of variations in the causal characteristic and a smoother control is obtained than would be the case if the basic system of Figure 1 were employed.

As many varied and apparently widely different embodiments of this invention may be made without departing from the spirit and scope thereof, it is to be understood that I do not limit myself to the specific embodiments thereof, except as defined in the appended claims.

I claim:

1. A system for the automatic control of a variable physical characteristic, comprising an indicating member tracing the variations of the characteristic to be controlled, compensating means operable to maintain the desired value of the characteristic, electrical means, including contact means operated by said indicating member and movable contact means associated therewith, for controlling the operation of said compensating means, coupling means associated with said compensating means and said movable contact means whereby said movable contact means is caused to follow closely in stepwise manner, within predetermined limits, the movements of the indicating member, and slowly acting restoring means, operating independently of said compensating means, and arranged to restore said movable contact means to the particular predetermined position which corresponds to the desired value of the characteristic under control.

2. A system for the automatic control of a variable physical characteristic, comprising an indicating member tracing the variations of the characteristic to be controlled, compensating means operable to maintain the desired value of the characteristic, electrical means including contact means operated by said indicating member and liquid contact means associated therewith for controlling the operation of said compensating means, coupling means associated with said compensating means and said liquid contact means whereby the level of the surface of said liquid contact means is caused to follow closely in stepwise manner, within predetermined limits, the movements of the indicating member, and means for gradually returning the level of the surface of said liquid contact means to a predetermined level corresponding to the desired value of the characteristic to be controlled, independently of said compensating means.

3. A system for the automatic control of a variable physical characteristic, comprising an indicating member tracing the variations of the characteristic to be controlled, a body of liquid, compensating means operable to maintain the desired value of the characteristic, means including a relay system for operating said compensating means, coupling means associated with said compensating means and said body of liquid, relative movements of said indicating member and a surface level of said body of liquid acting through said operating means to control the operation of said compensating means, said compensating means being associated with said coupling means whereby the surface level of said body of liquid is caused to follow closely in stepwise manner, within predetermined limits, the movements of the indicating member, and means including a resistant path for flow of liquid for gradually returning the aforesaid liquid surface level to a predetermined level corresponding to the desired value of the characteristic to be controlled.

4. A system as claimed in claim 3, in which the liquid level tends to return to the predetermined level as a result of liquid flow through a resistant path between the body of liquid the surface of which follows the movements of the indicating member and an external body of liquid of such a magnitude that the level of the surface of the same is substantially unaffected by said flow and the level of which is set to the desired value of the characteristic.

5. A system as claimed in claim 3, in which the predetermined level is displaced in accordance with any desired behavior of the characteristic.

6. A system as claimed in claim 3, in which the liquid level which follows the movements of the indicating member is subjected also to a displacement dependent upon the magnitude of a causal characteristic.

7. A system as claimed in claim 3, in which the relative movements of the indicating member and of the liquid level are those of a four-point electrical contact and a conducting liquid surface.

8. A system as claimed in claim 3, in which means for compensating for backlash or lost motion are provided in the connection between the coupling means and the compensating means.

9. A system as claimed in claim 3, in which means for compensating for backlash or lost motion are provided in the connection between the coupling means and the compensating means, said backlash compensating means comprising two coaxial pulleys having an amount of free relative movement corresponding to the backlash.

10. A system as claimed in claim 3, in which the coupling means between the compensating means and the liquid level is adapted to modify the effect of displacement of the compensating means in cases where the compensating effect due to a given displacement of the compensating means is not proportional to that displacement.

ALBERT CALLENDER.